United States Patent [19]

Hida

[11] Patent Number: 4,673,994
[45] Date of Patent: Jun. 16, 1987

[54] VIDEO CASSETTE RECORDER WITH CASSETTE VIEWING MECHANISM

[75] Inventor: Toshihiko Hida, Nagaokakyo, Japan

[73] Assignee: Mitsubishi Denki Kabushiki Kaisha, Tokyo, Japan

[21] Appl. No.: 694,323

[22] Filed: Jan. 24, 1985

[30] Foreign Application Priority Data

Mar. 5, 1984 [JP] Japan ................................. 59-42505
Mar. 23, 1984 [JP] Japan ................................. 59-56748
Mar. 29, 1984 [JP] Japan ................................. 59-62510

[51] Int. Cl.⁴ ..................... G11B 5/027; G11B 15/66; G03B 1/04
[52] U.S. Cl. .................................. 360/85; 242/199; 360/93; 360/96.5
[58] Field of Search ................ 360/85, 96.5, 96.6, 360/93, 95; 242/197–199

[56] References Cited

U.S. PATENT DOCUMENTS 3,638,955  2/1972  Wada ............................. 242/199 X
4,087,844  5/1978  Takahashi ........................ 360/96.6
4,484,240  11/1984 Yoshida ........................... 360/96.5

Primary Examiner—A. J. Heinz
Attorney, Agent, or Firm—Lowe Price LeBlanc Becker & Shur

[57] ABSTRACT

A video cassette recorder comprises a light source (12) for illuminating the upper surface of a cassette tape (2) loaded in a deck (5), a first mirror member (13) for reflecting the image of the cassette tape illuminated by the light source (12), a second mirror member (14) for reflecting to the front side of the video cassette recorder the image reflected by the first mirror member (13), and a movable lid (15) adapted to allow the image of the cassette tape reflected by the second mirror member (14) to be seen therethrough from outside.

19 Claims, 21 Drawing Figures

FIG. 1

PRIOR ART

VIDEO CASSETTE RECORDER WITH CASSETTE VIEWING MECHANISM

BACKGROUND OF THE INVENTION

1. Field of the Invention

This invention relates to a video cassette recorder having a mechanism capable of automatically loading a cassette tape into a deck when said cassette tape is simply inserted into an insertion opening, and more particularly it relates to a video cassette recorder (VCR) so designed that the running condition and residual amount of the loaded cassette tape can be ascertained from outside.

2. Description of the Prior Art

Figure 1:
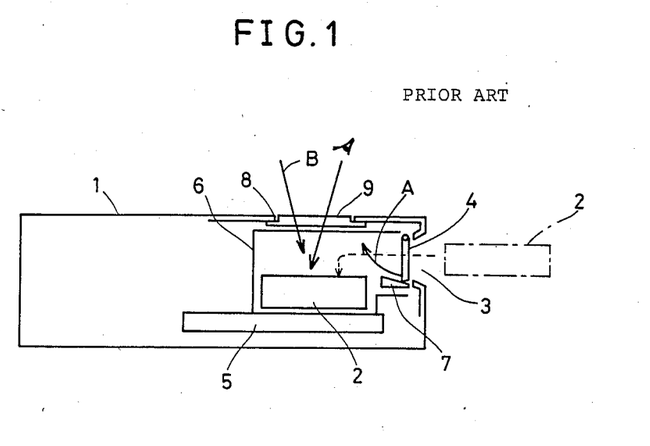
FIG. 1 is a schematic side sectional view of a conventional video cassette recorder, particularly showing a cassette tape viewing mechanism.

In VCRs having this type of mechanism, the means for ascertaining the running condition and residual amount of the loaded cassette tape has in the prior art been an indirect method which detects the number of revolutions of the tape, converts it into a electric signal and indicates it as a numerical value or time or an expedient method which, as shown in FIG. 1, relies on a visual inspection of the tape. Referring to FIG. 1, the front surface of a VCR housing 1 is formed with an insertion opening 3 for insertion of a cassette tape 2. The normally closed insertion opening 3 has a movable lid 4. Thus, when the cassette tape 2 is inserted into the insertion opening 3, the movable lid 4 pivots in the direction of arrow A, with the cassette tape 2 advancing in a path shown in broken line in the figure until it is loaded at a predetermined running position by an automatic loader 6 fixed to a mechanical deck 5. In addition, disposed on a surface below and inwardly of the insertion opening 3 is a guide member 7 for ensuring smooth insertion of the cassette tape 2. Further, the top wall of the VCR housing 1 is formed with an opening 8 having a see-through panel 9 mounted thereto. Thus, external light passes through the see-through panel 9, as indicated by arrow B in FIG. 1, to illuminate the upper surface of the cassette tape 2. In this way, the running condition and residual amount of the cassette tape 2 can be visually inspected from outside through the see-through panel 9.

Figures 2, 3:
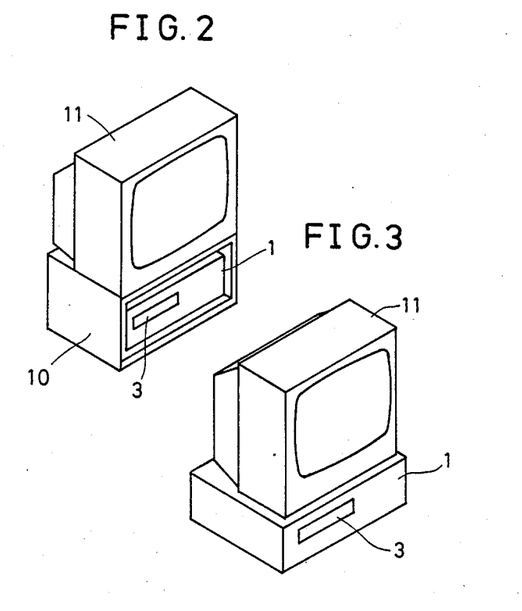
FIG. 2 is a perspective view showing the cassette tape recorder of FIG. 1 housed in a television stand.
FIG. 3 is a view showing a television set placed on the upper surface of the video cassette recorder of FIG. 1.

Of these conventional methods, the indirect one using electric signals requires costly and complicated circuitry and electric parts. Another drawback is that the inability to allow the user to look at the loaded cassette tape arouses an uneasy feeling in him. The method shown in FIG. 1 offers advantages that the cassette tape can be visually inspected and that this can be embodied at low cost. On the other hand, however, because of its arrangement in which the user has to look down at the cassette tape 2 through the see-through panel 9 fitted in the top wall of the housing 1, in cases where the video cassette recorder 1 is housed in a television stand 10 as shown in FIG. 2 or where as shown in FIG. 3 a television set 11 is placed on the upper surface of the video cassette recorder housing 1, the cassette tape 2 can no longer be visually inspected. A further drawback is that the long distance from the see-through panel 9 to the cassette tape 2 makes it impossible to take a good look at the cassette tape 2 except in an environment with a relatively large amount of light.

SUMMARY OF THE INVENTION

This invention eliminates the aforesaid drawbacks, and a principal object thereof is to provide a video cassette recorder wherein the running condition and residual amount of the cassette tape can be ascertained through the front side of the video cassette recorder and that even in a dark environment without involving any trouble.

This invention is a video cassette recorder comprising light emitting means for illuminating the upper surface of a cassette tape loaded in a deck, optical path changing means for leading the image of the cassette tape illuminated by said light emitting means to a cassette tape insertion opening, and light transmitting means installed at the insertion opening side of a box so that the image of the cassette tape led by said optical path changing means can be seen therethrough from outside the box.

According to this invention, the running condition and residual amount of the cassette tape can be ascertained through the front side of the video cassette recorder. Thus, even if the video cassette recorder is housed in a television stand or the television set is placed on the upper surface of the video cassette recorder, the condition of the cassette tape can be ascertained without any trouble. Further, since the user looks at the cassette tape obliquely downwardly from the front of the video cassette recorder, he can ascertain the condition of the cassette tape while assuming an unforced natural posture.

Further, since this invention can be relatively simply constructed without requiring any moving parts, it is advantageous from the standpoint of cost.

Since the light emitting means for illuminating the upper surface of a cassette tape is contained, the condition of the tape can be ascertained even in a dark environment. Further, if two mirror members are used as the optical path changing means, the image of the cassette tape can be visualized as the nonreversed, correct image.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
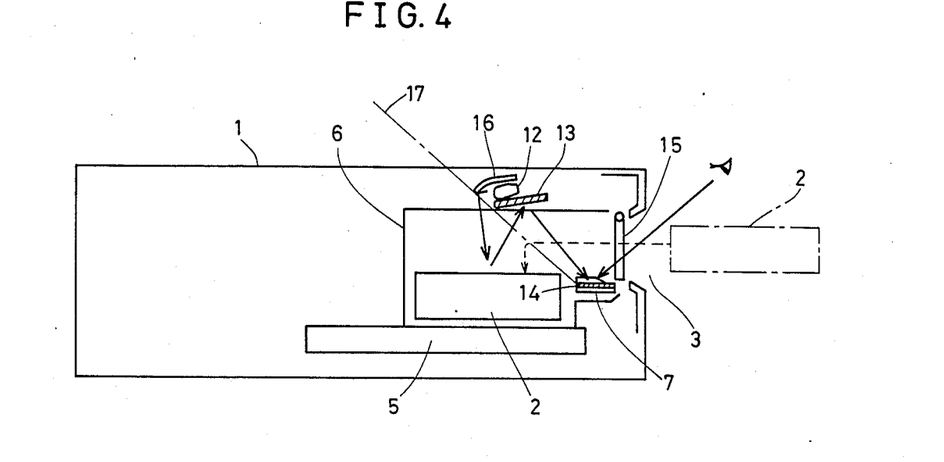
FIG. 4 is a schematic side sectional view of a first embodiment of this invention.
Figure 5:
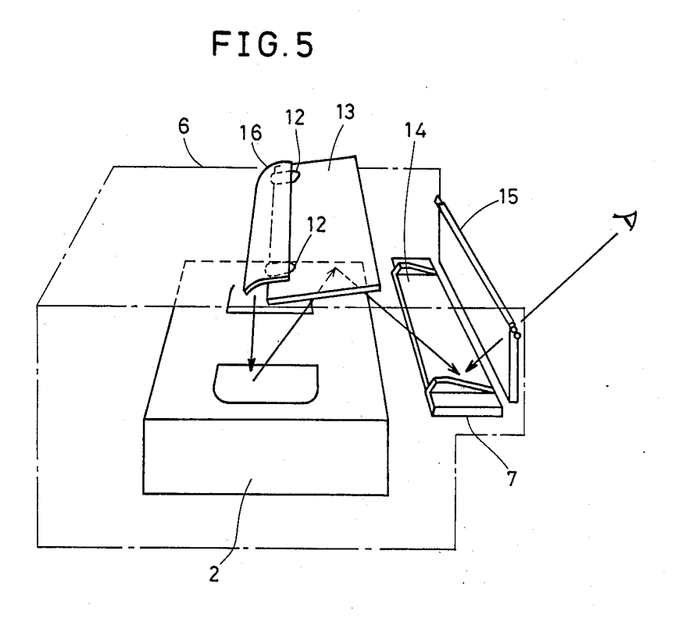
FIG. 5 is a perspective view showing the video cassette recorder of FIG. 4, with the housing omitted from illustration for convenience' sake.

FIGS. 4 and 5 show a first embodiment of this invention. In addition, the same reference numerals as those used in FIGS. 1 through 3 indicate the same parts and hence a description thereof will be omitted.

The first embodiment of the invention comprises light emitting means for illuminating the upper surface of a cassette tape 2 loaded in a deck 5, optical path changing means for leading the image of the cassette tape 2 illuminated by said light emitting means to an insertion opening 3, and light transmitting means arranged so that the image of the cassette tape 2 led by said optical path changing means can be seen therethrough from outside. The light emitting means comprises two light sources 12 and a reflecting plate 13 installed behind said light sources for reflecting the light from the light sources 12 to the cassette tape 2. The optical path changing means comprises a first mirror member 13 and a second mirror member 14. A movable lid 15 functions as the light transmitting means as well.

The first mirror member 13 is disposed above the cassette tape 2 loaded in the deck 5. More particularly, it is installed in the top of an automatic cassette loader 6. The first mirror member 13 reflects the image of the cassette tape 2 illuminated by the light sources 12 to the second mirror member 14.

The second mirror member 14 is disposed on a surface below and inwardly of the insertion opening 3. More particularly, it is pasted on the upper surface of a guide member 7. The second mirror member 14 reflects to the outside of the insertion opening 3 the image of the cassette tape 2 reflected by the first mirror member 13.

The movable lid 15 movably attached to the insertion opening 3 is arranged so that the image of the cassette tape 2 reflected by the second mirror member 14 can be seen through the movable lid 15 from outside. For example, the movable lid 15 is made of a see-through material.

According to the video cassette recorder constructed in the manner described above, the image of the cassette tape 2 reflected by the first and second mirror members 13 and 14 can be looked at through the movable lid 15 from outside. In a preferable example, the light sources 12 and the reflecting plate 16 are located forwardly of a plane 17 connecting the rear end edges of the first and second mirror members 13 and 14 and upwardly of the first mirror member 13. This is for the purpose of preventing the light from the light sources 12 from directly falling on the second mirror member 14. With this arrangement, the glare of the light sources 12 and of the reflecting plate 16 will not come in sight when the interior is seen through the movable lid 15 from outside, and hence a better image can be obtained. In addition, since the two mirror members 13 and 14 are used, indicatory letters or the like marked on the upper surface of the cassette tape 2 can be viewed in their nonreversed correct images.

Figure 6:
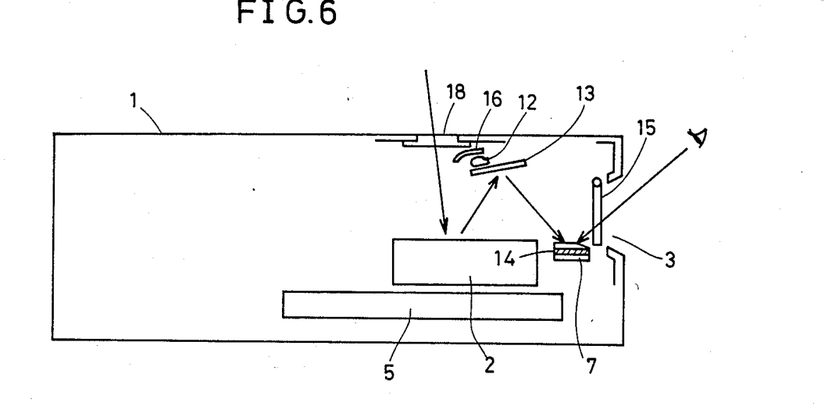
FIG. 6 is a schematic side sectional view of a second embodiment of the invention.

FIG. 6 is a schematic side sectional view of a second embodiment of the invention. In this embodiment, the top wall of the video cassette recorder box 1 is provided with a see-through panel 18 serving as a lighting window and as a peep window, so that external light passes through the see-through panel 18 to illuminate the upper surface of the cassette tape 2. This arrangement is economical as it allows selective use of the external light and light sources 12 depending upon environmental condition.

Figure 7:
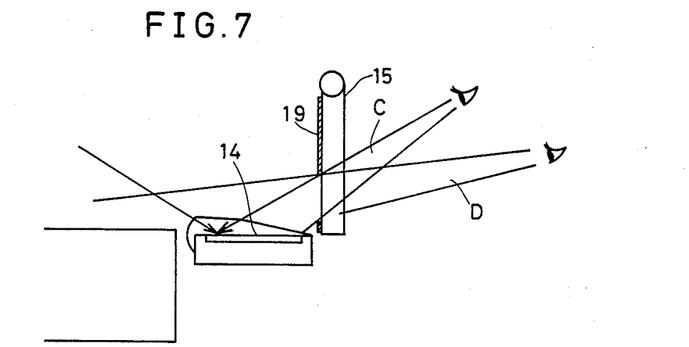
FIGS. 7, 8 and 9 are side sectional views showing other forms of movable lids used in embodiments of the invention.
Figure 8:
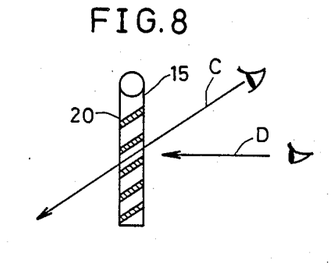
Figure 9:
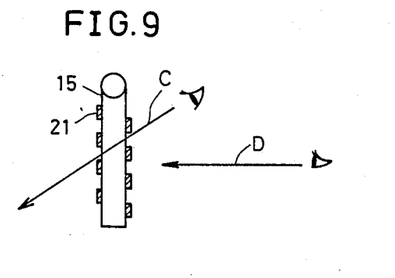

FIGS. 7 through 9 are side sectional views showing other forms of movable lids used in the first and second embodiments of the invention. In these figures, the movable lid 15 is provided with view obstructing means 19, 20 or 21 which ensures that the image of the cassette tape 2 reflected by the second mirror member 14 comes in sight only when it is viewed at a predetermined angle but that when viewed at other angles it cannot be seen. The view obstructing means 19 shown in FIG. 7 comprises opaque ink applied to a particular region of the back surface of the movable lid 15, e.g., the upper half and lower end portion of the movable lid 15. The view obstructing means 20 shown in FIG. 8 comprises a number of opaque members embedded in the movable lid 15. The opaque members 20 are arranged parallel at the same angle as the angle of reflection of light from the second mirror member 14. The view obstructing means 21 shown in FIG. 9 comprises opaque ink applied to the front and back surfaces of the movable lid 15 in an alternate parallel pattern. The provision of the view obstructing means 19, 20 or 21 on the movable lid 15 in this manner makes it possible to cut off the sight of the image when viewed at other angles than the one (in the direction of arrow C) at which the image can be seen. Thus, the internal construction can be put out of sight (when viewed in the direction of arrow D).

Figure 10:
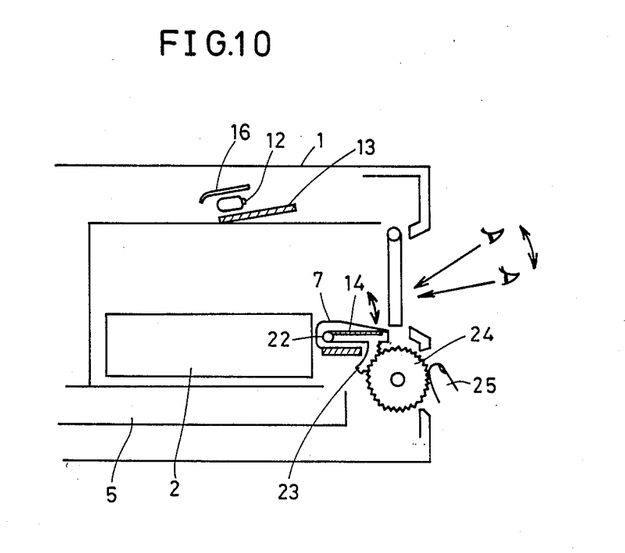
FIG. 10 is a schematic side sectional view of a third embodiment of the invention.
Figure 11:
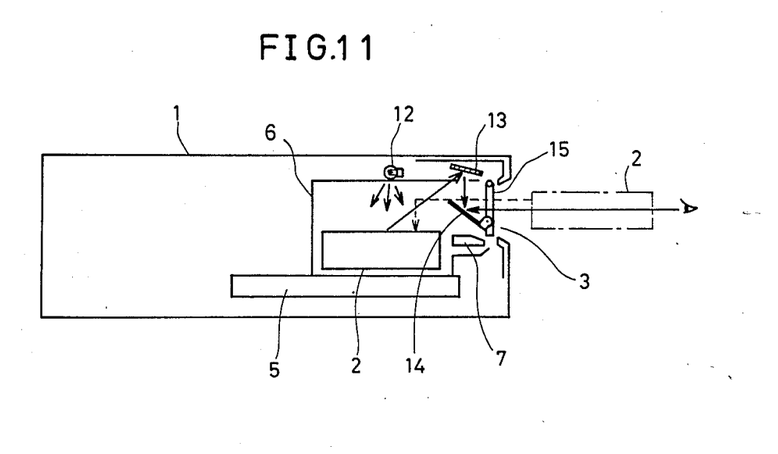
FIG. 11 is a schematic side sectional view of a fourth embodiment of the invention.
Figure 12:
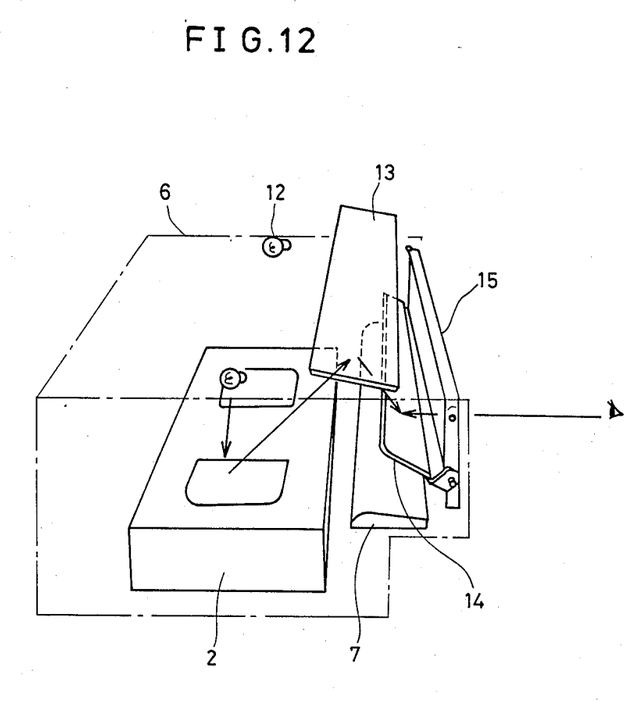
FIG. 12 is a perspective view showing the video cassette recorder of FIG. 11, with the box omitted from illustration for convenience' sake.
Figure 13:
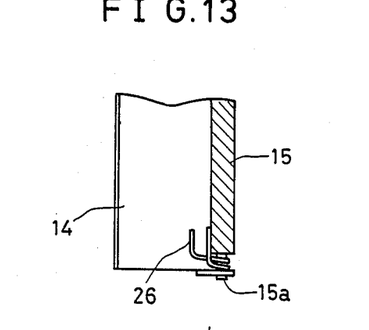
FIG. 13 is a plan view showing a movable lid 15 and a second mirror member 14 extracted from FIGS. 11 and 12.
Figure 14:
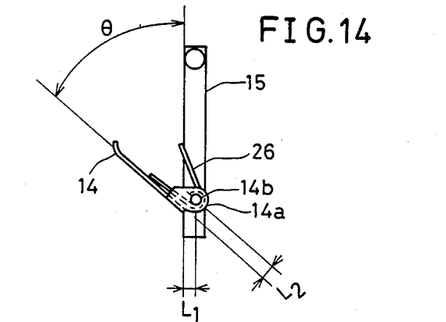
FIG. 14 is a side view of the movable lid 15 and second mirror member 14 shown in FIG. 13.

FIG. 10 is a schematic side sectional view of a third embodiment of the invention. In this embodiment, the second mirror member 14 is designed to be externally operable to adjust its angle of inclination. More particularly, the guide member 7 having the second mirror member 14 pasted thereto is adapted to be turned around a pivot 22. Further, the guide member 7 has a gear portion 23 which is turnable along with the guide member 7. Meshing with the gear portion 23 is a gear wheel, or adjusting knob 24 which is rotatably supported. The adjusting knob 24 is operable from outside the video cassette recorder box 1. Thus, if the adjusting knob 24 is rotated using a finger 25, the angle of inclination of the second mirror member 14 pasted to the guide member 7 will change. This arrangement enables the user to change, to some extent, the angle of view for seeing through. Thus, if the angle of inclination of the second mirror member 14 is suitably selected according to the position of installation of the video cassette recorder, it can be used under optimum conditions for the user.

FIGS. 11 through 15 show a fourth embodiment of the invention. In these figures, the video cassette recorder in this fourth embodiment comprises two light sources 12 forming light emitting means, first and second mirror members 13 and 14 forming optical path changing means for leading the image of a cassette tape 2 illuminated by said light emitting means to an insertion opening 3, and a movable lid 15 forming light transmitting means for enabling the image of the cassette tape 2 led by the optical changing means to be seen therethrough.

Figure 15:
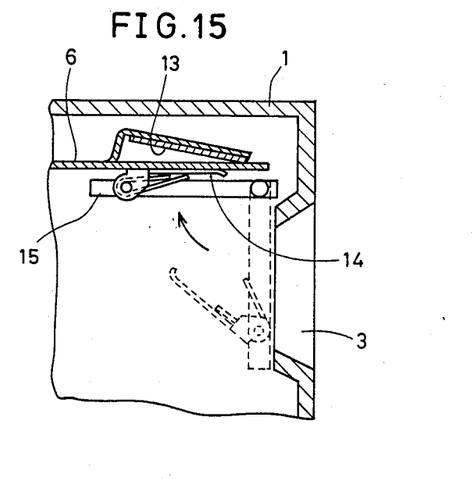
FIG. 15 is a view showing a state established after the movable lid 15 is turned in the direction of arrow from the state shown in FIG. 11.

In this embodiment, the second mirror member 14 is attached to the movable lid 15. More particularly, both ends of the second mirror member 14 are each provided with a flange member 14a having a shaft hole 14b. The second mirror member 14 is turnably attached to the movable lid 5 through a pair of support shafts 15a extending through the shaft holes 14b. As is clear from FIGS. 13 and 14, the torsion spring 26 serving as elastic means is installed on at least one of the support shafts 15a, so that whenever the movable lid 15 is closed, the second mirror member 14 is held at a predetermined angle θ with respect to the movable lid 15. When the cassette tape 2 is inserted through the insertion opening 3, as shown in FIG. 15, the movable lid 15 is turned and the second mirror member 14, while contacting the automatic cassette loader 6, is turned toward the movable lid 15 against the force of the torsion spring 26. When the movable lid 15 is in its closed state, the second mirror member 14 reflects to the outside of the insertion opening the image of the cassette tape 2 reflected by the first mirror member 13.

Figure 16:
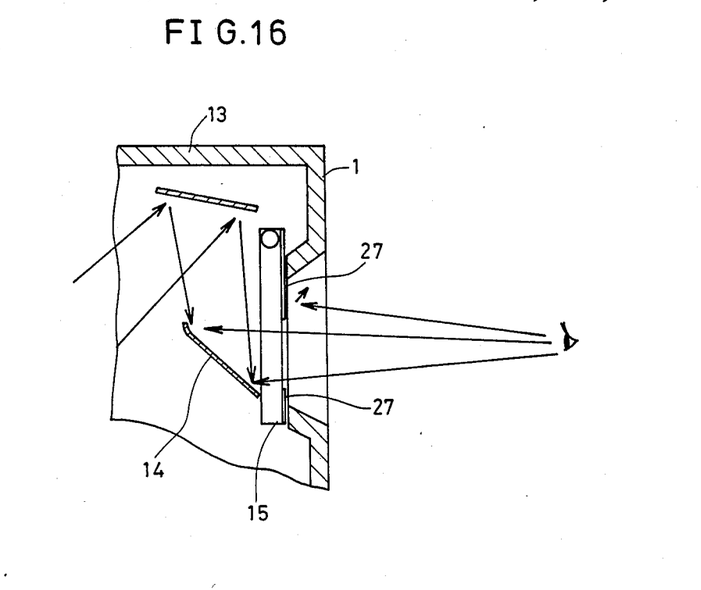
FIG. 16 is a schematic side sectional view of a fifth embodiment of the invention.

In this fourth embodiment as in the first through third embodiments, the image of the cassette tape 2 can be seen through the movable lid 15 from outside. Further, in this embodiment, too, as shown in FIG. 16 it is possible to hide the internal construction of the video cassette recorder by applying view obstructing means such as print marks 27 to part of the front or back surface of the movable lid 15.

Figure 17:
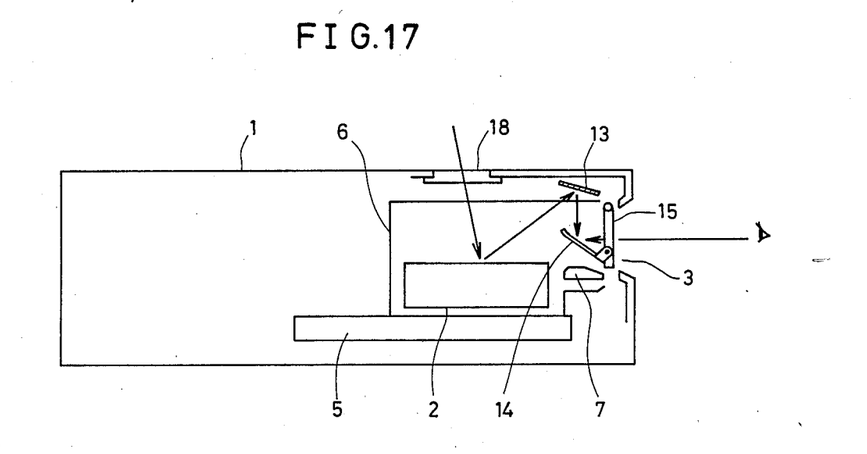
FIG. 17 is a schematic side sectional view of a sixth embodiment of the invention.

FIG. 17 shows a fifth embodiment of the invention. The illustrated video cassette recorder is provided on the top of the box 1 with a see-through panel 18 serving as a lighting window and peep-window. Thus, as in the second embodiment, external light is allowed to illuminate the upper surface of the cassette tape which has been loaded in the deck 5 through the see-through panel.

Figure 18:
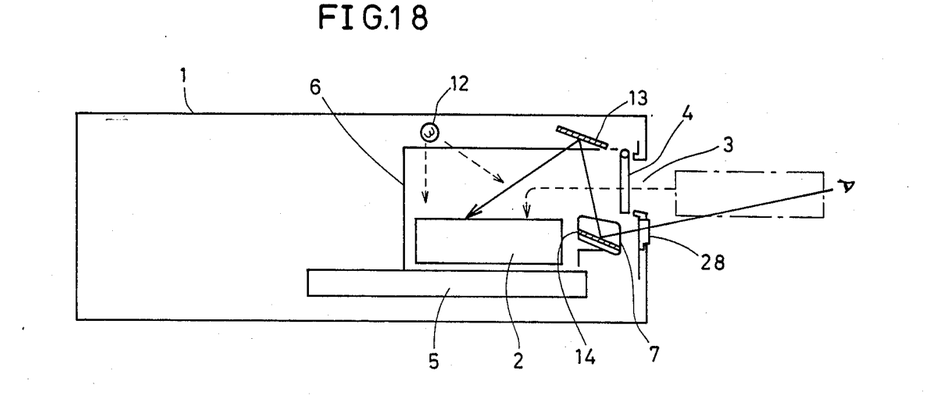
FIG. 18 is a schematic side sectional view of a seventh embodiment of the invention.
Figure 19:
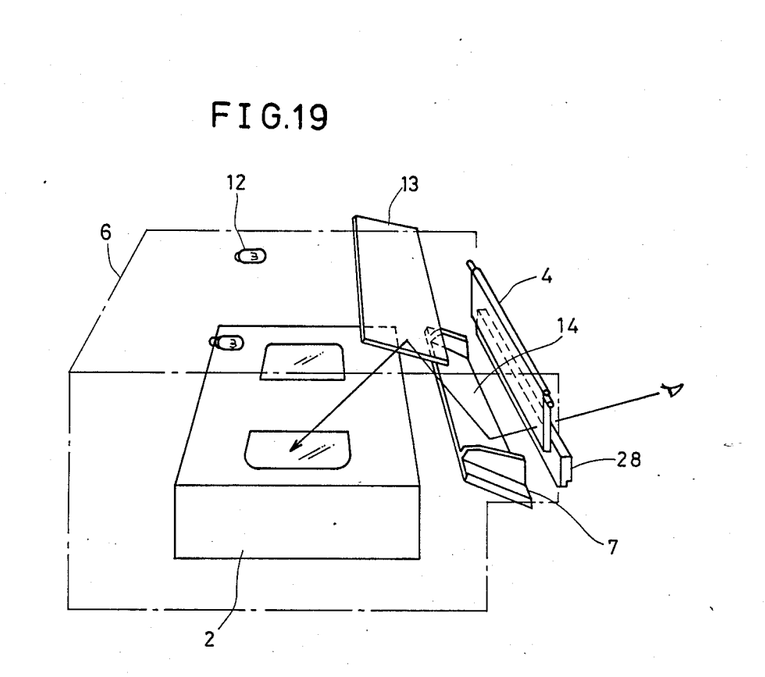
FIG. 19 is a perspective view showing the video cassette recorder of FIG. 18, with the box omitted from illustration for convenience' sake.

FIGS. 18 and 19 show a sixth embodiment of the invention. The video cassette recorder comprises two light source 12 forming light emitting means, first and second mirror members 13 and 14 forming optical path changing means for leading the image of the cassette tape 2 illuminated by the light emitting means to an insertion opening 3, and a see-through window 28 forming light transmitting means for enabling the image of the cassette tape 2 led by the optical path changing means to be seen therethrough.

The second mirror member 14 is disposed on a surface below and inwardly of the insertion opening 3. More particularly, it is pasted to the upper surface of a guide member 7. The second mirror member 14 reflects downwardly to the insertion opening 3 the image of the cassette tape 2 reflected by the first mirror member 13. A movable lid 4 is movably attached to the insertion opening 3. A see-through window 28 is installed in a portion of the box positioned below the insertion opening 3. The see-through window 28 is arranged so that the image of the cassette tape reflected by the second mirror member 14 can be seen therethrough from outside.

According to the video cassette recorder in the sixth embodiment constructed in the manner described above, the image of the cassette tape 2 reflected by the first and second mirror members 13 and 14 can be seen through the see-through window from outside, as in the first through fifth embodiments. In this case, since two mirror members 13 and 14 are used, indicatory letters or the like marked on the upper surface of the cassette tape can be viewed in their nonreversed correct images.

Figure 20:
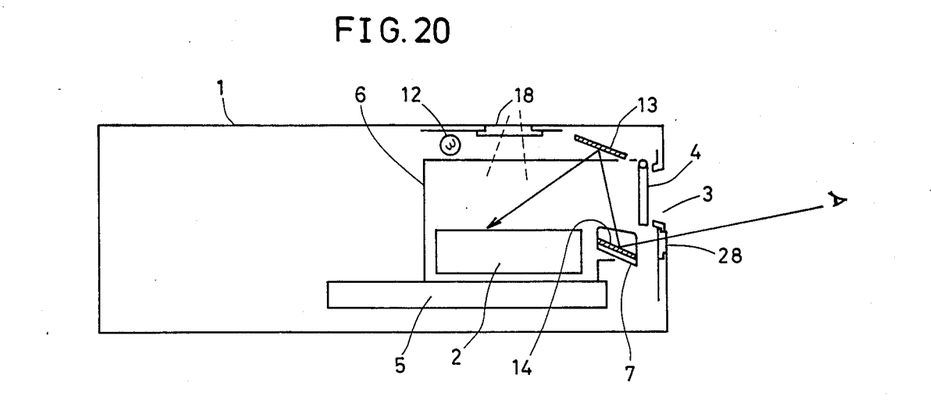
FIG. 20 is a schematic side sectional view of an eighth embodiment of the invention.

FIG. 20 shows a seventh embodiment of the invention. In this embodiment, the top wall of the video cassette recorder box 1 is provided with a see-through panel 18 serving as a lighting window and as a peep-window, to thereby allow external light to pass through the see-through panel 18 and illuminate the upper surface of the cassette tape 2 loaded in the deck 5.

Figure 21:
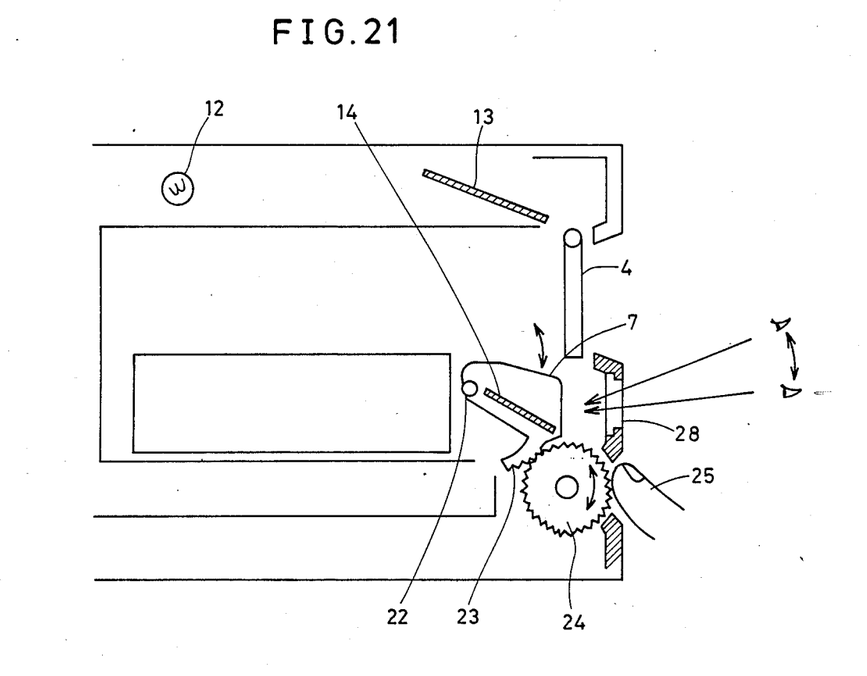
FIG. 21 is a schematic side sectional view of a ninth embodiment of the invention.

FIG. 21 shows an eighth embodiment of the invention. In this embodiment, as in the third embodiment, the second mirror member 14 is arranged so that its angle of inclination can be adjusted by the presence of a gear portion 23 and an adjusting knob 24. Thus, the user is allowed to use the device under optimum conditions by suitably adjusting the angle of inclination of the second mirror member 14 according to the place of installation of the video cassette recorder.

While first and second mirror members have been used as optical path changing means in the embodiments described so far, prisms or the like may be used in place of mirror members as optical path changing means.

Although the present invention has been described and illustrated in detail, it is clearly understood that the same is by way of illustration and example only and is not to be taken by way of limitation, the scope of the present invention being limited only by the terms of the appended claims.

What is claimed is:

1. A video cassette recoder, comprising a VCR housing (1) having a mechanism for automatically loading a cassette tape (2) into a deck (5) when said cassette tape (2) is simply inserted into an insetion opening (3) formed in said housing by moving said cassette tape along an insertion path extending from the insertion opening to a receiving area, said video cassette recorder further comprising:

light emitting means (12, 16) disposed in said housing (1) for illuminating an upper surface of the cassette tape (2) loaded in the deck (5);
    optical path changing means (13, 14) disposed in said housing (1) for transmitting an image of the cassette tape (2) illuminated by said light emitting means (12, 16) along a path which intersects the insertion path of the cassette and which extends towards said insertion opening (3); and
    light transmitting means (15, 28) disposed at the insertion opening (3) in said housing (1) for enabling the image of the cassette tape (2) led by said optical path changing means (13, 14) to be seen therethrough from outside.

2. A video cassette recorder as set forth in claim 1, wherein said light transmitting means (15, 18) includes a transparent movable lid (15) movably attached to cover said insertion opening (3).

3. A video cassette recorder as set forth in claim 2, wherein said optical path changing means (13, 14) comprises:

a first mirror (13) disposed above the tape (2) to reflect an image of the cassette tape illuminated by said light emitting means; and a second mirror (14) disposed on a surface below and inwardly of said insertion opening (3) to reflect through said movable lid (15) the image reflected by said first mirror (13).

4. A video cassette recorder as set forth in claim 3, including externally operated means for changing an angle of inclination of said second mirror.

5. A video cassette recorder as set forth in claim 3, wherein said light emitting means (12, 16) includes a light source (12), and a reflecting plate (16) for reflecting the light from said light source (12) to the cassette tape (2), said light source (12) and said reflecting plate (16) being positioned forwardly of a plane (17) connecting rear end edges of said first and second mirrors (13, 14) and upwardly of said first mirror (13), thereby preventing light from said light emitting means (12,16) from directly illuminating the second mirror (14).

6. A video cassette recorder as set forth in claim 2, wherein said movable lid (15) includes view obstructing means (19, 20, 21) to allow an image of the cassette tape (2) led by said optical path changing means (13, 14) to be seen through only when it is viewed at a predetermined viewing angle range.

7. A video cassette recorder as set forth in claim 6, wherein said view obstructing means (19, 20, 21) includes an opaque ink (19) applied to a particular area of a back surface of said movable lid (15).

8. A video cassette recorder as set forth in claim 6, wherein said view obstructing means (19, 20, 21) includes a plurality of opaque members (20) embedded in said movable lid (15) to extend substantially parallel to each other at a predetermined angle relative to a horizontal plane.

9. A video cassette recorder as set forth in claim 6, wherein said view obstructing means (19, 20, 21) includes an opaque ink (21) applied to front and back surfaces of the movable lid (15) in an alternate parallel pattern.

10. A video cassette recorder as set forth in claim 1, wherein the top wall of said box (1) is provided with a window (18) defining auxiliary light means, whereby external light is allowed to pass through said window (18) to illuminate the upper surface of the cassette tape (2) loaded in said deck (5).

11. A video cassette recorder, comprising a VCR housing (1) having a mechanism for automatically loading a cassette tape (2) into a deck (5) when said cassette tape (2) is simply inserted into an insertion opening (3) formed in said housing, said video cassette recorder further comprising:

light emitting means (12) installed in said housing (1) for illuminating an upper surface of the cassette tape (2) loaded in the deck (5), and a first mirror (13) installed in said housing (1) and positioned above the cassette tape (2) loaded in the deck (5) so as to reflect the image of the cassette tape (2) illuminated by said light emitting means (12);

a movable lid (15) movably attached to said insertion opening (3) and capable of being seen through; and a second mirror (14) installed below said movable lid (15) and adapted to reflect to the outside of said insertion opening (3) through the movable lid (15) the image of the cassette tape (2) reflected by said first mirror (13).

12. A video cassette recorder as set forth in claim 11, wherein said second mirror (14) is movably mounted on said movable lid (15).

13. A video cassette recorder as set forth in claim 11, wherein lower portions of opposite ends of said movable lid (15) are provided with a pair of support shafts (15a), while the second mirror (14) has a pair of shaft holes (14b) to receive said support shafts (15a), whereby said second mirror (14) is rotatable relative to said movable lid (15).

14. A video cassette recorder as set forth in claim 13, wherein at least one of said support shafts (15a) includes elastic means for maintaining said second mirror (14) at a predetermined angle with respect to said movable lid (15) when the latter is closed.

15. A video cassette recorder as set forth in claim 11, wherein said movable lid (15) is provided with view obstructing means (27) whereby the image of the cassette tape (2) reflected by said second mirror (14) can be seen through the movable lid only when it is viewed at a predetermined angle but at other angles the interior to the housing (1) is obscured.

16. A video cassette recorder as set forth in claim 11, wherein a top wall of said housing (1) is provided with a window (18) so that external light passes through said window (18) to illuminate the upper surface of the cassette tape loaded in the deck (5).

17. A video cassette recorder, comprising a VCR housing (1) having a mechanism for automatically loading a cassette tape (2) into a deck (5) when said cassette tape (2) is simply inserted into an insertion opening (3) formed in said housing, said video cassette recorder further comprising:

a light source (12) installed in said housing (1) to illuminate an upper surface of the cassette tape (2) loaded in said deck (5);

a first mirror (13) installed in said housing (1) and positioned above the cassette tape (2) loaded in said deck (5) to reflect an image of the cassette tape (2) illuminated by said light source (12);

a second mirror (14) disposed on a surface below and inwardly of said insetion opening (3) and adapted to reflect downwardly to said insertion opening (4) the image of the cassette tape (2) reflected by said first mirror (13); and a see-through window (28) disposed in said housing (1) and below said insertion opening (3) and adapted to allow the image of the cassette tape (2) reflected by said second mirror (14) to be seen therethrough from outside.

18. A video cassette recorder as set forth in claim 17, wherein a top wall of said housing (1) includes a window (18) so that external light is allowed to pass through said window (18) to illuminate the upper surface of the cassette tape (2) loaded into said deck (5).

19. A video cassette recorder as set forth in claim 17, wherein said second mirror (14) is externally operable to adjust its angle of inclination.

* * * * *